United States Patent
Stankiewicz et al.

(10) Patent No.: US 10,615,887 B1
(45) Date of Patent: Apr. 7, 2020

(54) MITIGATION OF NOISE GENERATED BY RANDOM EXCITATION OF ASYMMETRIC OSCILLATION MODES

(71) Applicant: Seagate Technology LLC, Cupertino, CA (US)

(72) Inventors: Andrzej Adam Stankiewicz, Edina, MN (US); Scott Wilson Stokes, Brooklyn Park, MN (US); Krishnan Subramanian, Shakopee, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 16/139,364

(22) Filed: Sep. 24, 2018

(51) Int. Cl.
*H04B 15/02* (2006.01)
*H04B 17/345* (2015.01)
*H04B 17/14* (2015.01)
*H04B 15/00* (2006.01)

(52) U.S. Cl.
CPC .......... *H04B 15/02* (2013.01); *H04B 15/005* (2013.01); *H04B 17/14* (2015.01); *H04B 17/345* (2015.01)

(58) Field of Classification Search
CPC ...... H04B 15/02; H04B 15/00; H04B 17/345; H04B 17/14; G01R 27/26
See application file for complete search history.

(56) References Cited

U.S. PATENT DOCUMENTS

| | | | | | |
|---|---|---|---|---|---|
| 4,979,233 | A | * | 12/1990 | Kawahata | H03D 7/1441 455/317 |
| 5,337,316 | A | * | 8/1994 | Weiss | H04B 17/19 714/716 |
| 5,383,064 | A | * | 1/1995 | Harman | G11B 5/09 360/45 |
| 5,442,498 | A | * | 8/1995 | Cheung | G11B 5/59655 360/77.08 |
| 5,532,820 | A | * | 7/1996 | Strolle | H04N 9/797 386/307 |

(Continued)

FOREIGN PATENT DOCUMENTS

| | | | | | |
|---|---|---|---|---|---|
| WO | WO-9418576 A2 | * | 8/1994 | ......... | G01R 33/0356 |
| WO | WO-2004068152 A1 | * | 8/2004 | ......... | G01R 15/205 |

(Continued)

OTHER PUBLICATIONS

A. Stankiewicz, Low Frequency Noise in Randomly Stimulated Asymmetric Oscillators, arXiv, Jun. 2018 (Year: 2018).*

(Continued)

*Primary Examiner* — Berhanu Tadese
(74) *Attorney, Agent, or Firm* — Westman, Champlin & Koehler, P.A.

(57) ABSTRACT

An apparatus and method for mitigating noise in a waveform from a signal-producing device. The method includes receiving the waveform from the signal-producing device, and decomposing the waveform into low frequency (LF) and high frequency (HF) components. The method also includes determining an instant amplitude of the HF component, and employing the instant amplitude of the HF component and possibly the LF component to obtain a noise correction value for the LF component. The method further includes adding the obtained noise correction value to the LF component to obtain an output signal.

20 Claims, 12 Drawing Sheets

(56) References Cited

U.S. PATENT DOCUMENTS

| | | | | |
|---|---|---|---|---|
| 5,596,418 A * | 1/1997 | Strolle | ............... | H04N 5/923 348/427.1 |
| 5,673,355 A * | 9/1997 | Strolle | ............... | H04N 5/923 348/708 |
| 5,748,891 A * | 5/1998 | Fleming | ............... | G01S 1/045 342/132 |
| 6,134,373 A * | 10/2000 | Strolle | ............... | H04N 9/797 386/304 |
| 6,157,116 A * | 12/2000 | Sampietro | ............... | G10K 11/178 310/334 |
| 6,246,827 B1 * | 6/2001 | Strolle | ............... | H04N 5/923 348/392.1 |
| 6,349,079 B1 * | 2/2002 | Belser | ............... | G11B 11/10576 369/44.26 |
| 6,433,531 B1 * | 8/2002 | Regev | ............... | G01R 23/145 324/77.11 |
| 6,501,268 B1 * | 12/2002 | Edelstein | ............... | G01R 33/02 324/225 |
| 6,670,809 B1 * | 12/2003 | Edelstein | ............... | G01R 33/02 324/225 |
| 6,714,389 B1 * | 3/2004 | Pokhil | ............... | G11B 5/39 360/324.12 |
| 7,157,947 B2 * | 1/2007 | Chansungsan | ... | G01R 19/16552 327/143 |
| 8,068,316 B2 * | 11/2011 | Dieny | ............... | B82Y 25/00 360/324.11 |
| 8,310,320 B2 * | 11/2012 | Duraffourg | ............... | H03H 3/0073 333/186 |
| 8,320,080 B1 * | 11/2012 | Braganca | ............... | G01R 33/098 360/125.3 |
| 8,405,390 B2 * | 3/2013 | Pannetier-Lecoeur | ............... | G01R 33/093 324/248 |
| 8,582,247 B2 * | 11/2013 | Song | ............... | B82Y 25/00 360/315 |
| 8,619,393 B2 * | 12/2013 | Stokes | ............... | G01R 33/093 360/319 |
| 8,664,950 B2 * | 3/2014 | Mok | ............... | G01R 33/098 324/210 |
| 8,929,034 B2 * | 1/2015 | Stokes | ............... | G01R 33/093 360/319 |
| 9,047,881 B2 * | 6/2015 | Edelstein | ............... | G11C 11/16 |
| 9,171,559 B1 * | 10/2015 | Nikolaev | ............... | G11B 5/3932 |
| 9,196,272 B1 * | 11/2015 | Nikolaev | ............... | H01L 43/12 |
| 9,602,110 B1 * | 3/2017 | Caffee | ............... | H03L 1/00 |
| 9,847,106 B1 * | 12/2017 | Kim | ............... | G11C 5/14 |
| 9,886,974 B2 * | 2/2018 | Stokes | ............... | G11B 5/3912 |
| 2001/0033607 A1 * | 10/2001 | Fleming | ............... | G01S 5/0072 375/150 |
| 2004/0185781 A1 * | 9/2004 | Moloudi | ............... | H03B 21/01 455/63.1 |
| 2005/0041342 A1 * | 2/2005 | Huai | ............... | B82Y 25/00 360/324.12 |
| 2005/0055621 A1 * | 3/2005 | Adelmann | ............... | G06F 11/1008 714/758 |
| 2005/0107062 A1 * | 5/2005 | Miyagi | ............... | H04B 1/28 455/323 |
| 2005/0122138 A1 * | 6/2005 | Chansungsan | ... | G01R 19/16552 327/78 |
| 2008/0238410 A1 * | 10/2008 | Charlier | ............... | G01R 33/0017 324/202 |
| 2009/0235742 A1 * | 9/2009 | Matsumoto | ............... | G01C 19/56 73/504.12 |
| 2009/0315549 A1 * | 12/2009 | Hackner | ............... | G01R 33/07 324/251 |
| 2010/0213933 A1 * | 8/2010 | Mather | ............... | G01R 33/098 324/252 |
| 2010/0271018 A1 * | 10/2010 | Clinton | ............... | G01R 33/07 324/252 |
| 2010/0322454 A1 * | 12/2010 | Ambrose | ............... | H04R 1/1016 381/380 |
| 2011/0312287 A1 * | 12/2011 | Ramachandran | ...... | H04B 15/02 455/77 |
| 2012/0229935 A1 * | 9/2012 | Song | ............... | B82Y 25/00 360/313 |
| 2012/0326686 A1 * | 12/2012 | Dai | ............... | H04B 1/0475 323/283 |
| 2013/0028297 A1 * | 1/2013 | Casey | ............... | G06F 17/141 375/147 |
| 2013/0044394 A1 * | 2/2013 | Stokes | ............... | G01R 33/093 360/319 |
| 2013/0096825 A1 * | 4/2013 | Mohanty | ............... | G01C 21/165 701/472 |
| 2013/0142349 A1 * | 6/2013 | Liu | ............... | G10K 11/002 381/71.11 |
| 2014/0097842 A1 * | 4/2014 | Yang | ............... | G01R 33/60 324/316 |
| 2014/0104726 A1 * | 4/2014 | Stokes | ............... | G01R 33/093 360/123.12 |
| 2014/0192934 A1 * | 7/2014 | Ciacci | ............... | H04L 25/06 375/329 |
| 2015/0092808 A1 * | 4/2015 | Li | ............... | H01S 5/1075 372/95 |
| 2015/0160126 A1 * | 6/2015 | Carangelo | ............... | G01N 21/3504 356/437 |
| 2015/0212166 A1 * | 7/2015 | Kandori | ............... | A61B 5/055 324/252 |
| 2015/0294683 A1 * | 10/2015 | Harper | ............... | H02K 3/20 360/75 |
| 2016/0054397 A1 * | 2/2016 | Kim | ............... | G01V 3/38 506/39 |
| 2016/0242690 A1 * | 8/2016 | Principe | ............... | A61B 5/742 |
| 2017/0012664 A1 * | 1/2017 | Casey | ............... | G06F 17/141 |
| 2017/0125046 A1 * | 5/2017 | Stokes | ............... | G11B 5/3912 |
| 2017/0168123 A1 * | 6/2017 | Kandori | ............... | A61B 5/055 |
| 2017/0343695 A1 * | 11/2017 | Stetson | ............... | G01V 3/101 |
| 2017/0356813 A1 * | 12/2017 | Smerzi | ............... | G01L 9/0052 |
| 2018/0275221 A1 * | 9/2018 | Bruce | ............... | G01R 33/032 |

FOREIGN PATENT DOCUMENTS

| | | | | |
|---|---|---|---|---|
| WO | WO-2004068158 A1 * | 8/2004 | ............ | G01R 33/035 |
| WO | WO-2009001160 A1 * | 12/2008 | ............ | B82Y 25/00 |

OTHER PUBLICATIONS

Pannetier et al., Noise in small magnetic systems—applications to very sensitive magnetoresistive sensors Journal of Magnetism and Magnetic Materials, Elsevier Science Publishers, vol. 290-291, Apr. 2005. (Year: 2006).*

Wang et al, Thermally Modulated Flux Concentrator for Minimizing 1f Noise in Magnetoresistance-Based Field Sensors, IEEE vol. 44, No. 11, Nov. 2008, Nov. 2, 2008.*

S. F. Norrelykke and H. Flyvbjerg, "Harmonic Oscillator in Heat Bath: Exact simulation of time-lapse-recorded data, exact analytical benchmark statistics", Phys. Rev. E, vol. 83, 041003-14, Feb. 2011. (Year: 2011).*

R. Lifshitz and M. C. Cross, "Nonlinear Dynamics of Nanomechanical and Micromechanical Resonators," In Reviews of Nonlinear Dynamics and Complexity, vol. 1, H. G. Schuster, Ed. Weinheim: Wiley-VCH, 2008, pp. 1-52. (Year: 2008).*

A. Stankiewicz, "Low frequency thermal noise in magneto-resistive sensors," Dig. 8th Joint European Magnetic Symposia (JEMS), Glasgow (UK), Aug. 2016. (Year: 2016).*

A. Stankiewicz and S. Hernandez, "Damping constant estimation in magnetoresistive readers," J. Appl. Phys. 117, 17E319 (2015). (Year: 2015).*

Samir K. Ashour and Mahmood A. Abdel-hameed, "Approximate skew normal distribution", Journal of Advance Research, vol. 1, Issue 4, pp. 341-350, Oct. 2010. (Year: 2010).*

Sh. Kogan, Electronic Noise and Fluctuations in Solids, Cambridge: CUP, 2008 (Year: 2008).*

S. F. Norrelykke and H. Flyvbjerg, "Harmonic Oscillator in Heat Bath: Exact simulation of time-lapse-recorded data, exact analytical benchmark statistics", Phys. Rev. E, vol. 83, 041003-14, Feb. 2011.

(56) References Cited

OTHER PUBLICATIONS

R. Lifshitz and M. C. Cross, "Nonlinear Dynamics of Nanomechanical and Micromechanical Resonators," in Reviews of Nonlinear Dynamics and Complexity, vol. 1, H. G. Schuster, Ed. Weinheim: Wiley-VCH, 2008, pp. 1-52.
A. Stankiewicz, "Low frequency thermal noise in magneto-resistive sensors," Dig. 8th Joint European Magnetic Symposia (JEMS), Glasgow (UK), Aug. 2016.
A. Stankiewicz and S. Hernandez, "Damping constant estimation in magnetoresistive readers," J. Appl. Phys. 117, 17E319 (2015).
Samir K. Ashour and Mahmood A. Abdel-hameed, "Approximate skew normal distribution", Journal of Advance Research, vol. 1, Issue 4, pp. 341-350, Oct. 2010.
Sh. Kogan, Electronic Noise and Fluctuations in Solids, Cambridge: CUP, 2008.

\* cited by examiner

MITIGATION OF NOISE GENERATED BY RANDOM EXCITATION OF ASYMMETRIC OSCILLATION MODES

SUMMARY

In one embodiment, a method is provided. The method includes performing noise detection operations and noise correction calibration operations for an apparatus comprising a signal-producing device. The noise detection and noise correction calibration operations include receiving a first sample waveform from the signal-producing device, and decomposing the first sample waveform into first low frequency (LF) and first high frequency (HF) components. An instantaneous amplitude waveform is generated using the first HF component. Correlations between the instantaneous amplitude waveform and portions of the first LF component are then detected. Noise correction values for the detected correlated portions of the first LF component are calculated. The noise correction values are stored in a lookup table on a non-transitory data storage medium of the apparatus.

In another embodiment, an apparatus is provided. The apparatus includes a signal-producing device and a noise-mitigation circuit. The noise-mitigation circuit receives a waveform from the signal-producing device and decomposes the waveform into low frequency (LF) and high frequency (HF) components. The noise-mitigation circuit also determines an instant amplitude of the HF component. Additionally, the noise-mitigation circuit employs at least the instant amplitude of the HF component to enable noise correction for the LF component.

In yet another embodiment, a method is provided. The method includes performing noise detection operations for an apparatus comprising a signal-producing device. The noise detection operations include receiving a first waveform from the signal-producing device, and decomposing the first waveform into first low frequency (LF) and first high frequency (HF) components. The noise detection operations also include generating an instantaneous amplitude waveform using the first HF components, and detecting correlations between the instantaneous amplitude waveform and portions of the first LF component. The method further includes performing noise correction calibration operations based on the detected correlations between the instantaneous amplitude waveform and portions of the first LF component.

Other features and benefits that characterize embodiments of the disclosure will be apparent upon reading the following detailed description and review of the associated drawings.

DETAILED DESCRIPTION OF ILLUSTRATIVE EMBODIMENTS

Figure 1:
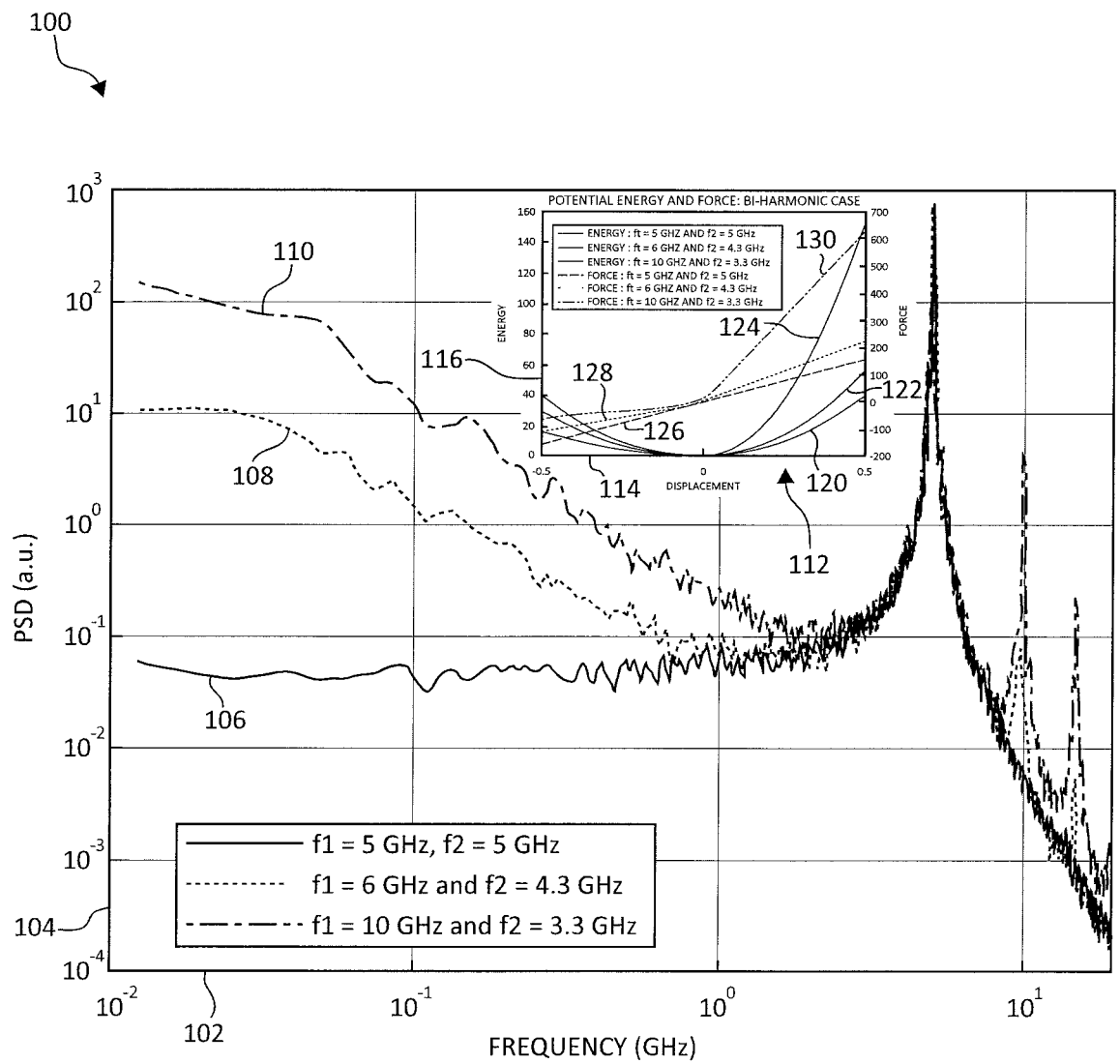
FIG. 1 is a graph that depicts simulated oscillation spectra for a bi-harmonic oscillator potential.

Embodiments of the disclosure relate to mitigation of noise generated by random excitation of asymmetric oscillation modes. Prior to providing a description of the different embodiments, a description of such oscillation modes is provided below.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

Many physical systems and devices operate in a quasi-static regime in contact with a thermal bath, which leads to fluctuating oscillations around an energy minimum. For linear systems, the spectrum of these oscillations replicates a resonance curve of a damped oscillator. In particular, power spectral density grows monotonically with frequency in a low frequency (LF) range, until reaching a maximum at a resonant frequency. Small sizes of contemporary magnetoresistive readers and other micro-electromechanical systems (MEMS)/nano-electromechanical systems (NEMS) devices push oscillations to non-linear regimes, which may lead to resonance line broadening, bifurcations, etc. However, non-linearity does not change a monotonicity of thermal fluctuations in the LF range, until the energy profile is symmetric around the energy minimum.

Asymmetry of the energy profile around the stable point leads to LF thermal noise with a 1/f-like spectral profile. This phenomenon results in M-shaped LF noise dependence versus magnetic field in magnetic tunneling readers.

In magnetoresistive readers, it has been shown that magnetic precession can be approximated in terms of a one-dimensional damped oscillator. It serves as a primary basis for this investigation. 5 gigahertz (GHz) asymmetric oscillators (which may be a resonant frequency for a reader free layer) in contact with a thermal bath were analyzed using the Langevin equation. Potential energy profiles were generated using bi-harmonic and skew normal approximations, providing the ability to generate symmetric and asymmetric potentials using a single adjustable parameter. FIG. 1 is a graph 100 that depicts simulated oscillation spectra for a bi-harmonic oscillator potential. In graph 100, a horizontal axis 102 represents frequency in GHz and a vertical axis 104 represents power spectral density (PSD) in arbitrary units (a.u.). The bi-harmonic plot of FIG. 1 shows 3 curves 106, 108 and 110, with curve 106 representing symmetric (harmonic) oscillations and curves 108 and 110 representing asymmetric oscillations. Curves 106, 108 and 110 have a main resonance peak that is essentially the same at 5 GHz. Differences are outlined in insert graph 112, which has a horizontal axis 114 that represents displacement, a first vertical axis 116 that represents energy and a second vertical axis 118 that represents force. Plots 120, 122 and 124 are energy plots that correspond to curves 106, 108 and 110, respectively. Similarly, plots 126, 128 and 130 are force plots that correspond to curves 106, 108 and 110, respectively. FIG. 1 shows that symmetric oscillations result in low and flat LF noise. Also, FIG. 1 shows an increasing power spectral density at low frequencies as asymmetry is introduced. Asymmetric oscillations introduce a direct current (DC) shift, and the presence of random fluctuations in this asymmetric potential produces a broadening of the DC frequency spike leading to a pronounced 1/f-like low-frequency shape to the spectral density.

Figure 2A:
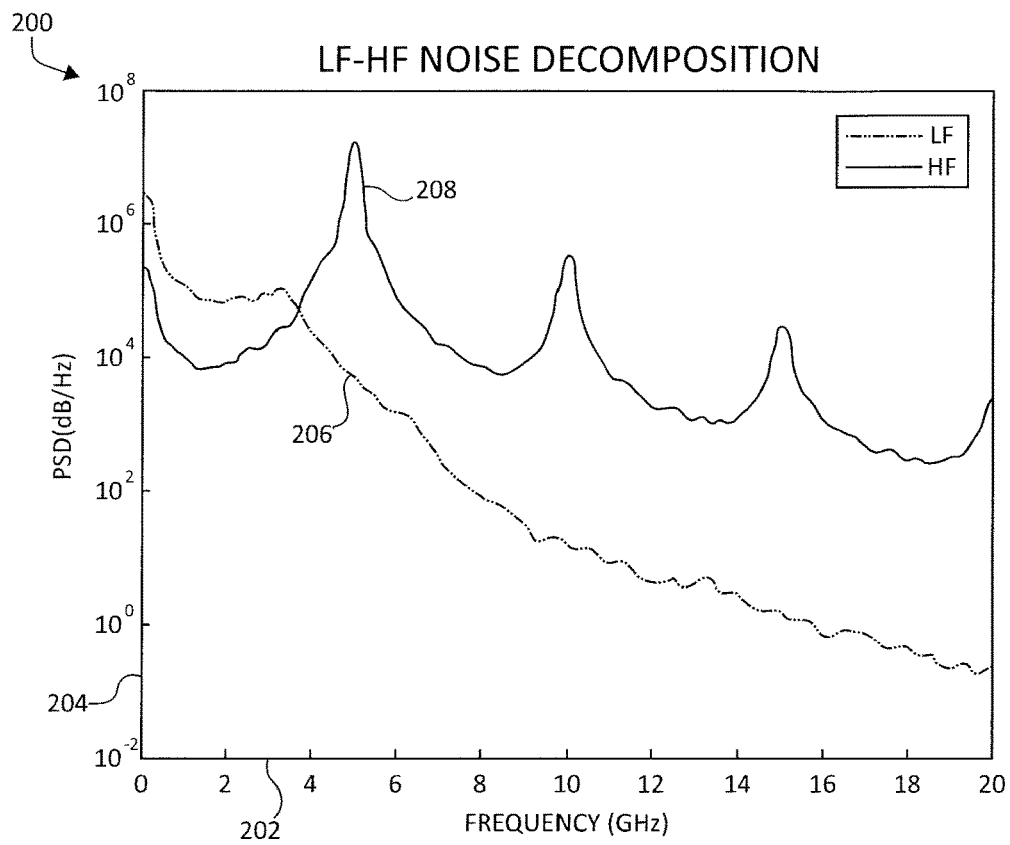
FIG. 2A is a graph showing time-domain low frequency and high frequency signal decomposition for a bi-harmonic oscillator.

In order to further characterize the nature of this 1/f-like low frequency noise profile, the time domain signal for the asymmetric oscillator was decomposed into low and high frequency components as shown in graph 200 of FIG. 2A. An optimal decomposition technique depends on particular device properties. Empirical Mode Decomposition was used here, and similar results can be obtained using low- and high/band-pass filters. Band-pass filtering may be particularly useful when more than one asymmetric resonance contributes to LF noise, allowing the calculating of corrections due to each of them.

Figure 2B:
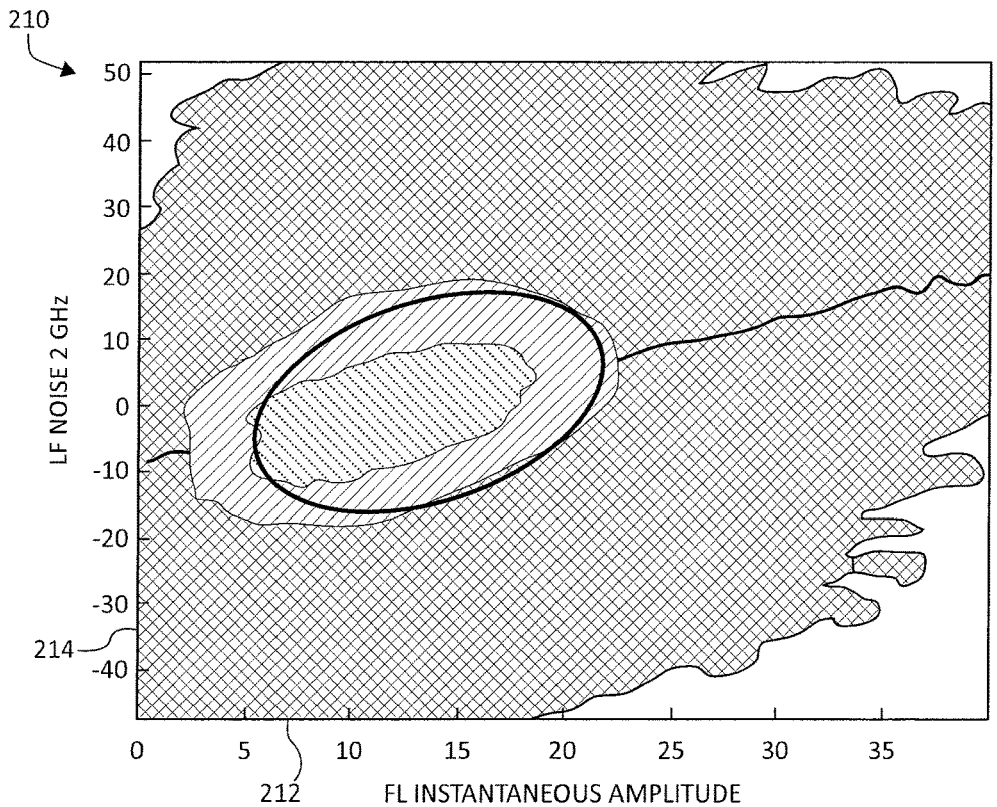
FIG. 2B is a two-dimensional histogram of low frequency (LF) noise and high frequency (HF) instantaneous amplitude.

In FIG. 2A, a horizontal axis 202 represents frequency in GHz and a vertical axis 204 represents PSD in decibels (dB)/Hz. Plot 206 is a low frequency component plot and plot 208 is a high frequency component plot. Then upper and lower envelopes of the high frequency component were extracted, and instantaneous oscillation amplitude was calculated as a difference between them. FIG. 2B shows a two dimensional histogram 210 of LF noise (represented by a vertical axis 214) and high frequency instantaneous amplitude (represented by a horizontal axis 212 for free layer (FL) instantaneous amplitude). The strong correlation seen in FIG. 2B confirms that the 1/f-like low frequency noise originates from fluctuations of asymmetric oscillations. This model demonstrates a new mechanism of 1/f noise generation.

Figure 3A:
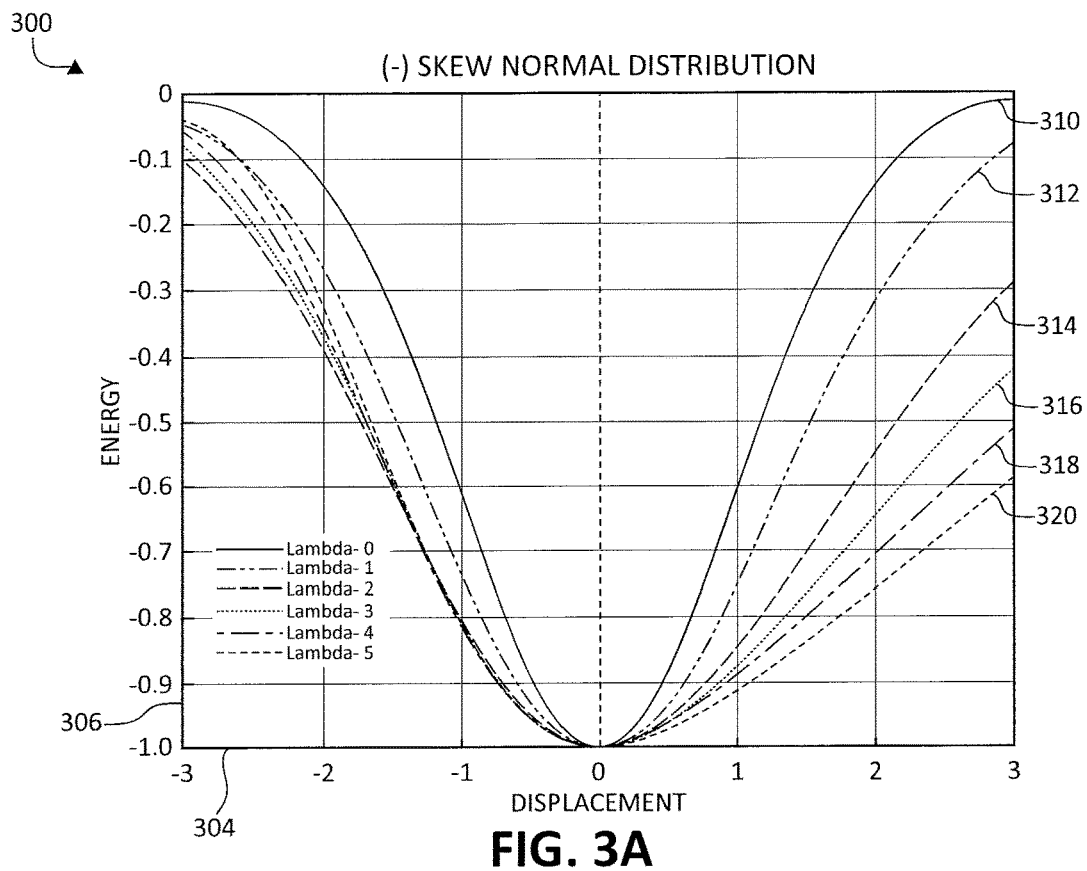
FIGS. 3A and 3B are graphs showing asymmetric energy minima and a corresponding restoring force, respectively, based on skew normal distribution.
Figure 3B:
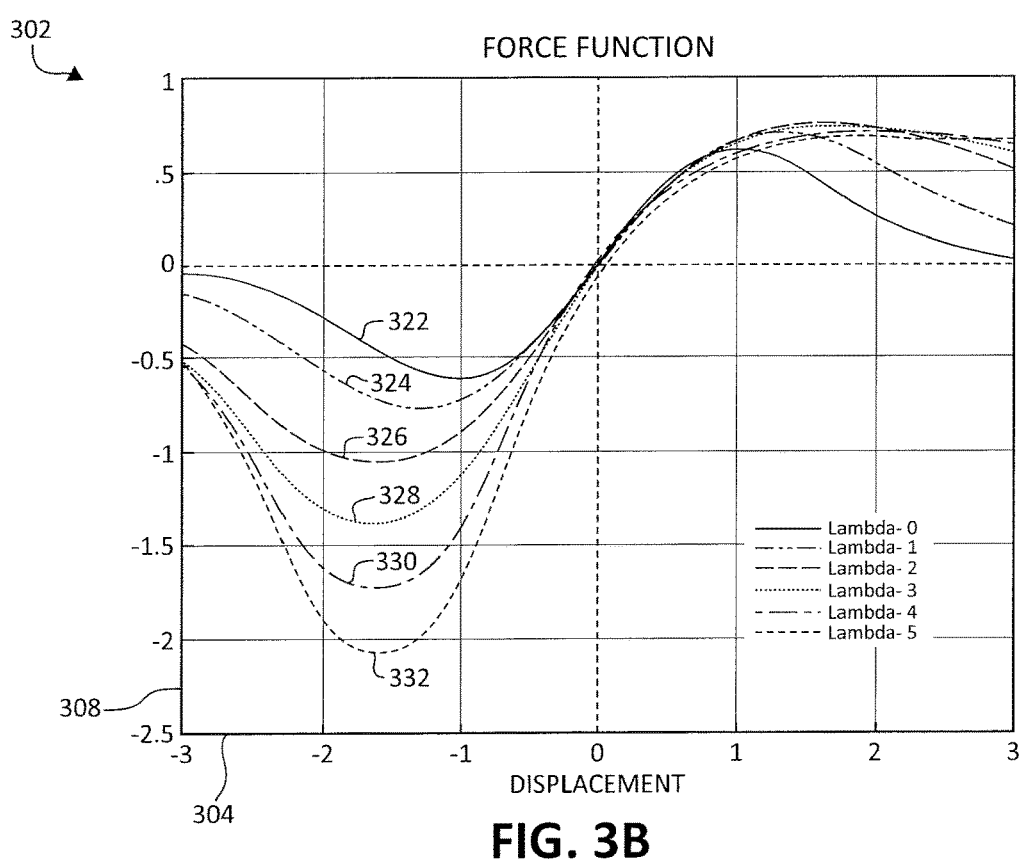
Figure 4:
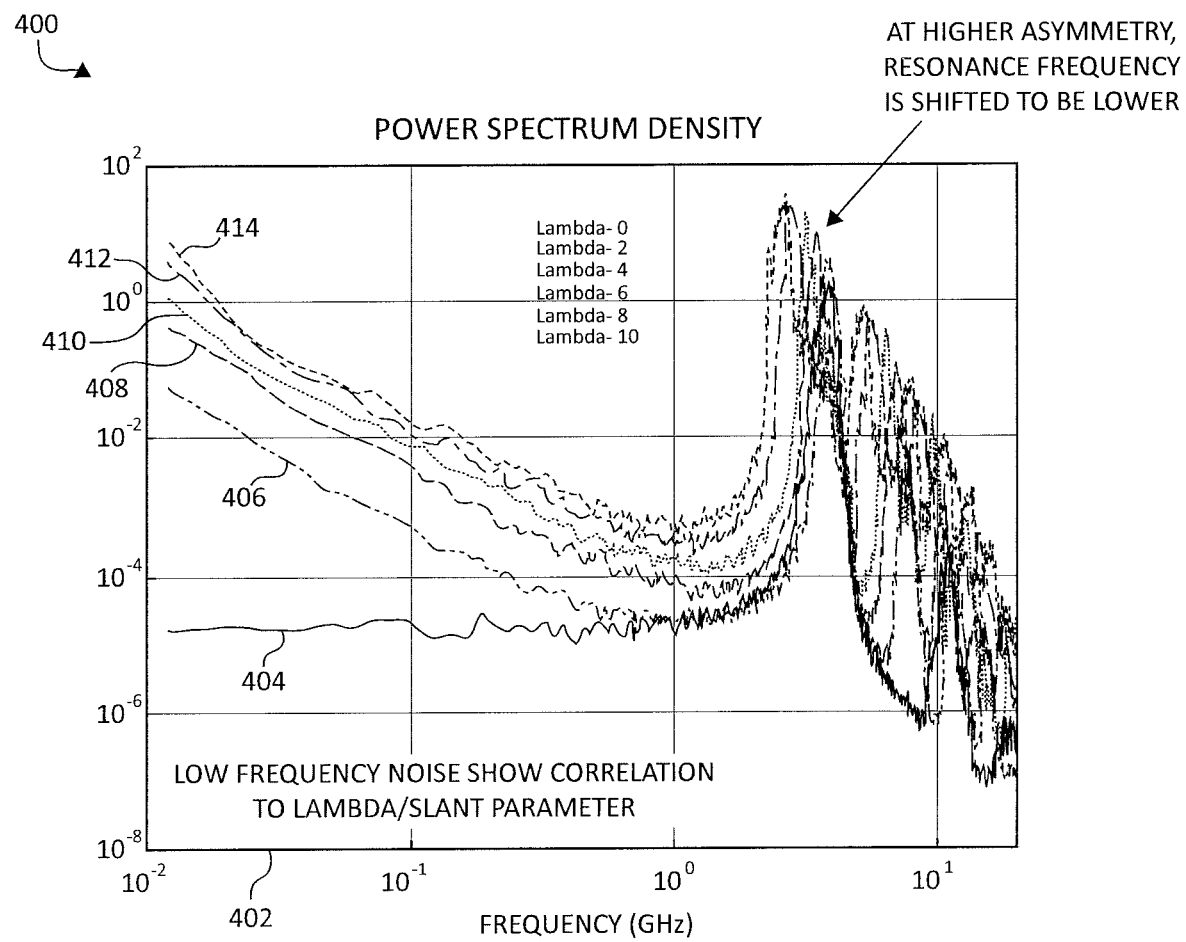
FIG. 4 is a graph that shows a power spectrum density plot.

Another instructive model function is based on a skew normal distribution (SND), shown in FIG. 3A and FIG. 3B. FIG. 3A is a graph 300 showing asymmetric energy minima and FIG. 3B is a graph 302 showing a corresponding restoring force. In FIG. 3A, a horizontal axis 304 represents displacement and a vertical axis 306 represents energy. FIG. 3B employs the same horizontal axis 304 as FIG. 3A and includes a vertical axis 308 that represents force. The SND-based model shown in FIGS. 3A and 3B adds nonlinearity for both energy branches, and asymmetry is controlled by a single parameter Lambda (e.g., a slant parameter). Other model parameters were adjusted to ensure constant 5 GHz frequency of very small oscillations for any Lambda. The different curves 310-320 of FIG. 3A are for Lambda values 0-5, respectively. Similarly, curves 322-332 of FIG. 3B represent Lambda values 0-5, respectively. Nonlinearity contributes to resonance peak shift and broadening, but clearly the LF noise is still a result of asymmetry (as can be seen in FIG. 4). FIG. 4 shows a power spectrum density plot 400 of 5 GHz oscillation modelled by the Langevin equation in potential energy depicted in FIG. 3A. In FIG. 4, a horizontal axis 402 represents frequency in GHz. Plots 404-414 represent Lambda values of 0, 2, 4, 6, 8 and 10, respectively. In particular, the plot 404 (corresponding to symmetric oscillations) shows low and flat LF noise, while for asymmetric cases 1/f noise dependence is preserved down to very low frequencies.

Typical magnetoresistive (tunneling) readers are comprised of ferromagnetic free, reference and pinned layers (FL, RL, PL, respectively), which are stabilized with interlayer interactions and bias magnetic fields. External fields (e.g. due to magnetic media) cause magnetization rotations in the FL, resulting in resistance changes. At finite temperature, the magnetization fluctuates around the energy minimum, resulting in output noise. In nanostructures, these oscillations may be quite large (e.g., 10-20 degrees), and go beyond the range of the harmonic approximation. However, the resonant frequency is large (e.g., about 5 GHz), and the resulting noise in the operational band (e.g., <2 GHz) remains small, until the excitations become asymmetric around the equilibrium point, resulting in 1/f-like noise.

Figure 5A:
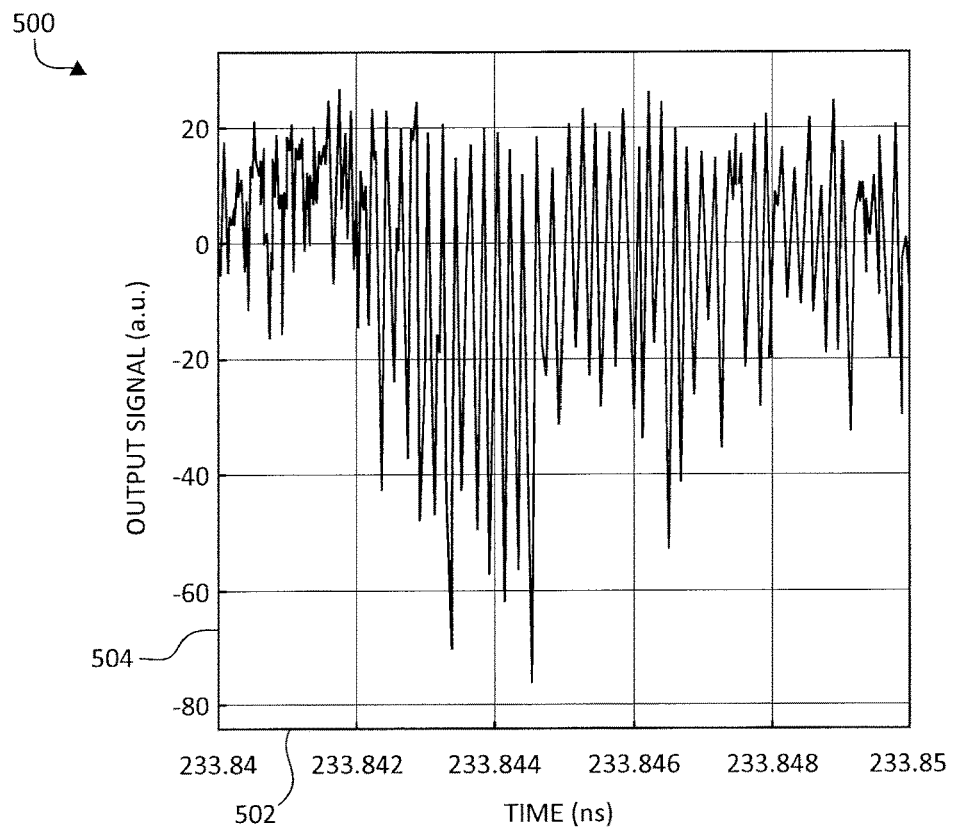
FIG. 5A is a graph showing a portion of a reader noise waveform.
Figure 5B:
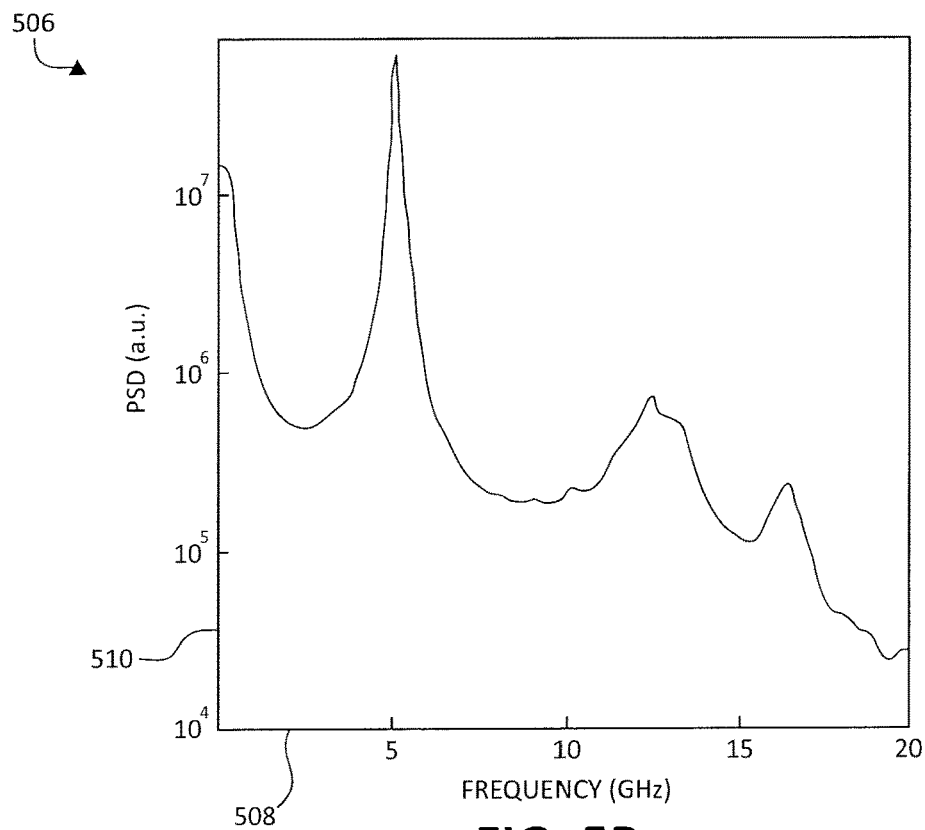
FIG. 5B is a plot that represents a corresponding power spectral density distribution for the reader noise waveform shown in FIG. 5A.

In an experiment, the quasi-static reader output signal was probed in the time domain using an Integral Solutions International (ISI) ferromagnetic resonance spectroscopy (FMR) tester and an external oscilloscope. The system analog bandwidth was 18 GHz, and waveforms were collected at a sampling rate of 80 giga-samples (GSa)/s. FIG. 5A shows a small section of a reader noise waveform 500. In FIG. 5A, a horizontal axis 502 represents time in nanoseconds (ns) and a vertical axis 504 represents an output signal in a.u. Oscillation asymmetry is evident in FIG. 5A. FIG. 5B is a plot 506 that represents a corresponding PSD distribution. In FIG. 5B, a horizontal axis 508 represents frequency in GHz and a vertical axis represents PSD in a.u. PSD in FIG. 5B reveals a prominent LF resonance peak (at ~5 GHz), along with other resonance lines at high frequencies (>10 GHz), and strong 1/f-like noise below 2 GHz (b) (e.g., in the LF range).

Figure 6:
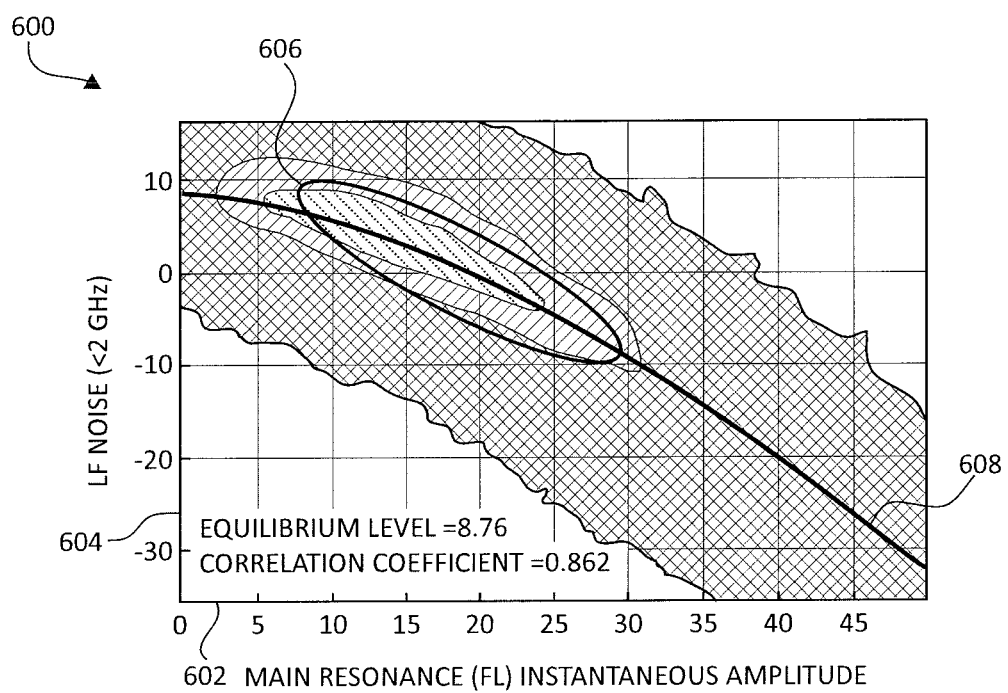
FIG. 6 is a two-dimensional histogram of LF noise and HF instantaneous amplitude.

In order to prove that LF noise is mostly a result of the observed oscillation asymmetry, the signal is decomposed into LF (<2 GHz) and HF (>2 GHz) components. Such operations may be carried out by either empirical mode decomposition (EMD), or by zero-phase-shift numerical filters. The HF portion is then used to produce the instantaneous amplitude waveform, using a simple envelope algorithm (the Hilbert transform may be used as well). A two-dimensional histogram 600 of the LF noise (represented by a vertical axis 604) and HF instantaneous amplitude (represented by a horizontal axis 602) is shown in FIG. 6. A strong correlation (e.g., within ellipse 606) and a shift of the equilibrium signal (corresponding to null instantaneous HF amplitude) confirm oscillation asymmetry to be a source of LF noise, while regression nonlinearity (e.g., line 608) reveals oscillation nonlinearity.

While the above description is substantially focused on the presence of low frequency noise in asymmetric magnetic readers, it is fully expected to be manifest in many other systems, possibly explaining the widespread presence of 1/f noise.

The ability to retrieve noise dependence from broadband waveforms (FIGS. 5A and 5B) provides an opportunity to compensate LF noise by producing and adding a correction waveform. An example LF noise compensation algorithm/method includes:

- Collecting a sample noise waveform, decomposing the collected sample noise waveform into LF and HF components, and creating a correcting function by finding a regression line of LF signal versus HF instantaneous amplitude.
- If asymmetry depends on particular conditions (e.g. external field, temperature, etc.), repeating the previous steps for all applicable conditions.
- During device operation, detecting HF amplitude, producing a correcting signal, and adding the correcting signal to the output signal in the real time. LF noise of an obtained resulting signal is substantially reduced.
- If some of the external conditions cannot be determined during device operation (e.g. external field in a magnetoresistive reader), the LF component may be substituted as an approximated reference.

Figure 7A:
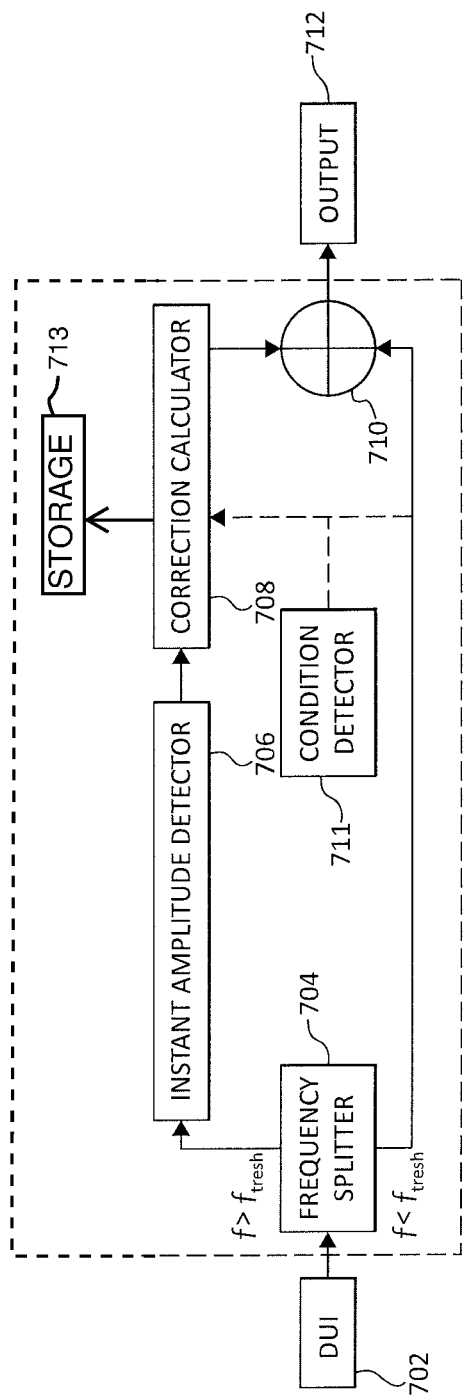
FIG. 7A is a block diagram of a noise mitigation system in accordance with one embodiment.
Figure 7B:
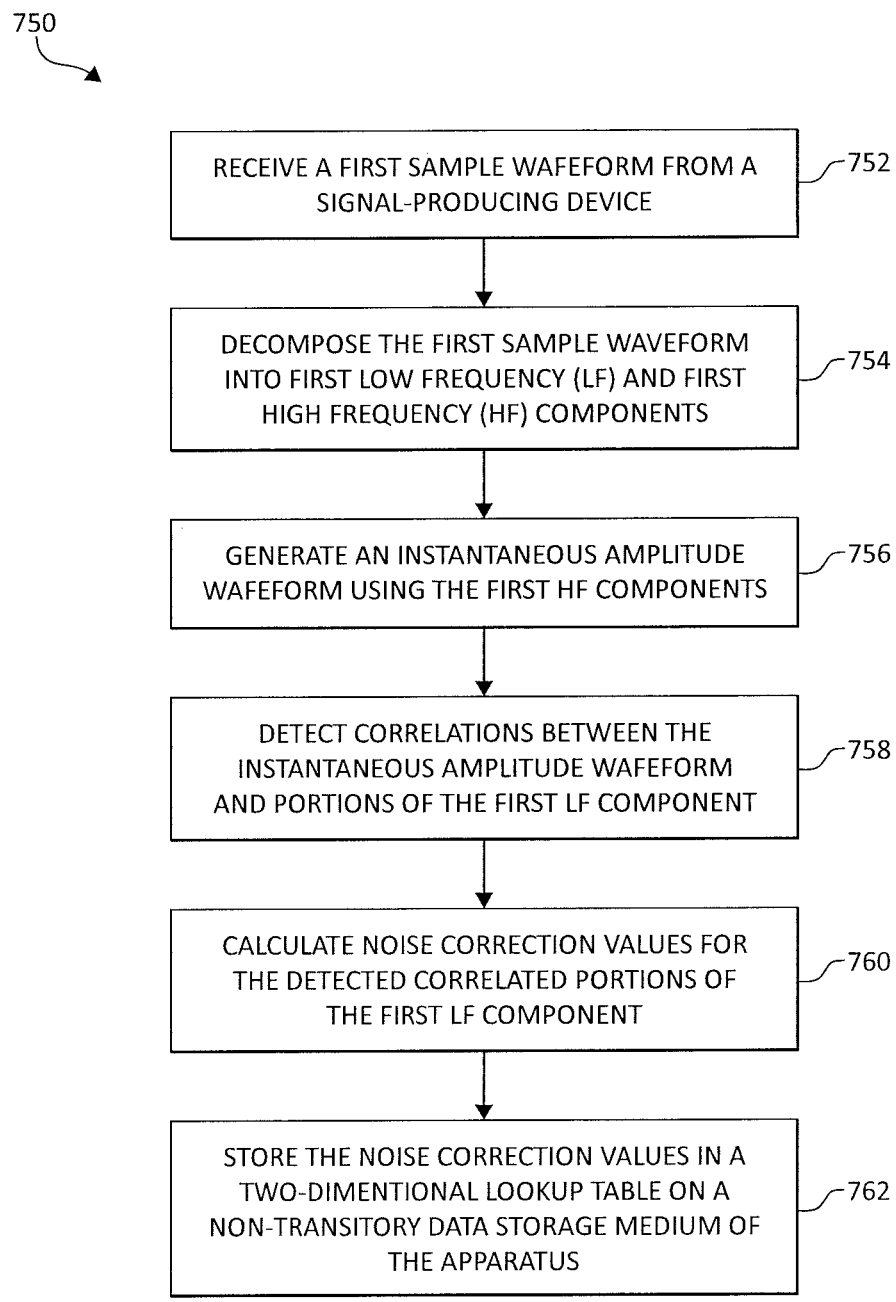
FIGS. 7B and 7C are flowcharts of a method embodiment.

FIG. 7A illustrates a noise mitigation system/circuit 700 in accordance with one embodiment. The noise mitigation system 700 of FIG. 7A employs a frequency splitter circuit 704, an instant amplitude detection circuit 706, a correction determination/calculation circuit 708 and a summing node 710 to carry out the above-described steps. In some embodiments, system/circuit 700 may include a condition detector 711 that is capable of detecting an external field, a temperature, etc. As indicated above, noise detection and noise calibration-related operations are first performed. The operations are shown in FIG. 7B, which is a flow diagram of a method 750. Referring to FIGS. 7A and 7B, the method initially involves, at block 752 of FIG. 7B, receiving a first sample waveform (e.g., a test sample waveform) from a signal-producing device (e.g., device under investigation (DUI) 702 of FIG. 7A). At block 754 of FIG. 7B, the first sample waveform is decomposed into first LF and first HF components. This may be carried out by frequency splitter 704 of FIG. 7A that utilizes a predetermined threshold frequency ($f_{tresh}$) to obtain LF components that have frequency values below ft and HF components that have frequency values above $f_{tresh}$. In some cases, band-pass filtering may be more suitable optimal. At block 756 of FIG. 7B, the HF components are fed to instant amplitude detector 706 of FIG. 7A that generates an instantaneous amplitude waveform using the first HF component. At block 758 of FIG. 7B, correlations between the instantaneous amplitude waveform and portions of the first LF component are detected. At block 760 of FIG. 7B, noise correction values are calculated for the detected correlated portions of the first LF component. At block 762 of FIG. 7B, the noise correction values are stored in a one- or two-dimensional lookup table on a non-transitory data storage medium 713. The one-dimensional lookup table includes different HF amplitude values and noise correction values corresponding to the different HF amplitude values. The two-dimension lookup tables include different HF amplitude values along with detected condition values and/or LF signal values, and corresponding noise correction values. The stored noise correction values may be utilized for LF noise compensation during normal operation of the signal producing device 702 in a manner described below in connection FIG. 7C, which is a flow diagram of a method 770.

Figure 7C:
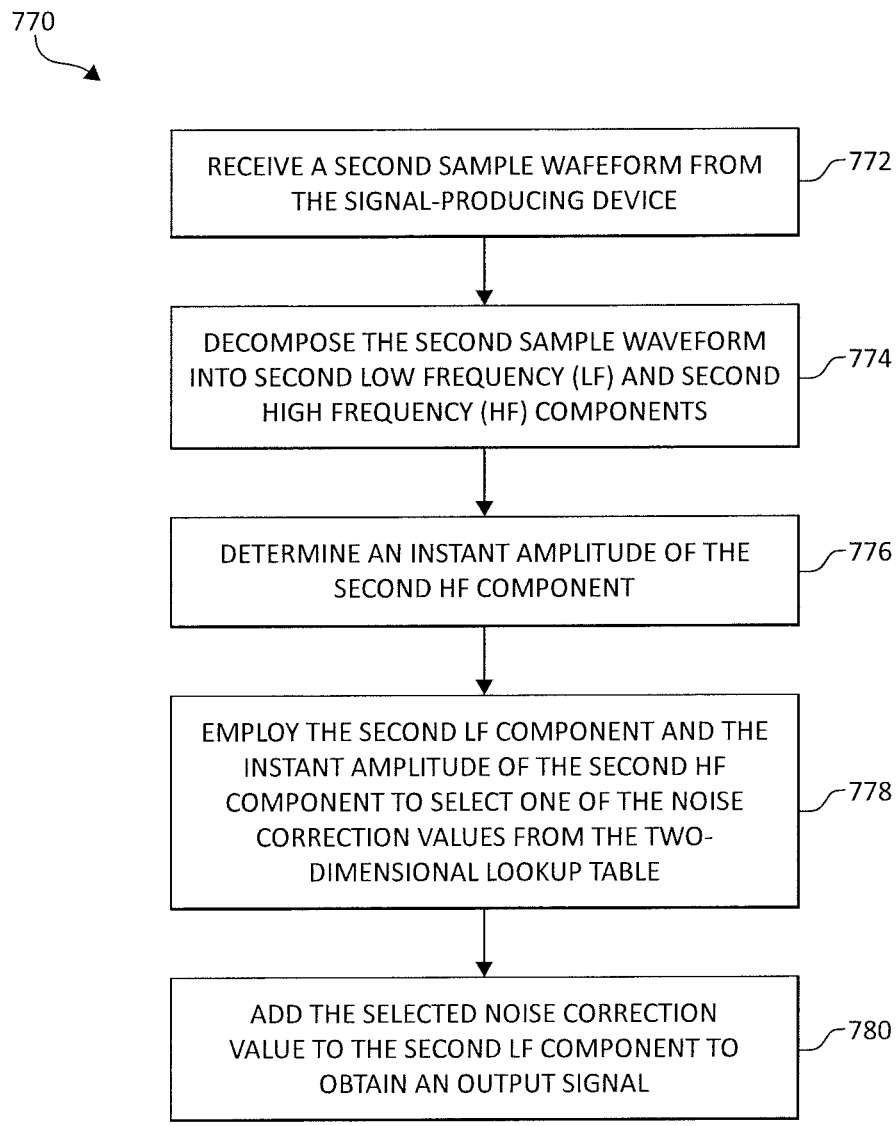

Referring now to FIGS. 7A and 7C, at block 772 of FIG. 7C, a second sample waveform (e.g., a normal-operation sample waveform) is received from the signal-producing device 702 of FIG. 7A. At block 774 of FIG. 7C, the second sample waveform is decomposed into second LF and second high HF components by frequency splitter 704 of FIG. 7A. At block 776 of FIG. 7C, an instant amplitude of the second HF component is determined by instant amplitude detector 706 of FIG. 7A. At block 778, the second the instant amplitude of the second HF component and LF component (if applicable) are employed by correction calculator 708 of FIG. 7A to select one of the noise correction values from the one- or two-dimensional lookup table. In some embodiments, the correction calculator 708 includes processing circuitry that carries out a lookup table search based on instantaneous HF amplitude for a one-dimensional lookup table, and additionally based on an external condition reference for a two-dimensional lookup table. If the external condition(s) cannot be detected in real time, the LF signal may be used as an approximated reference. The different detected/captured values of HF amplitude, external conditions and LF signals may be different at different time instants. Thus, in such embodiments, the lookup table search carried out by the processing circuitry involves matching a value of HF amplitude captured at a particular time instant with a stored HF amplitude value in the lookup table for the one-dimensional lookup table case. For the two-dimensional lookup table case, the processing circuitry may additionally match an external condition value (e.g., an external magnetic field value) captured at the particular time instant with an external conditional value stored in the lookup table and, if the additional condition cannot be detected, matches the LF signal value obtained at the particular time instant with a LF signal value stored in the lookup table. Once a suitable match is obtained, the noise correction value in that table record is selected as the compensation value. At block 780 of FIG. 7C, the selected noise correction value is added to the second LF component by summing node 710 of FIG. 7A to obtain an output signal 712 of FIG. 7A.

It should be noted that elements 704, 706, 708, etc., are employed for LF noise compensation in the above-described embodiments because simply employing a filter for LF noise filtering will result in a removal of useful HF components of the signal from the signal-providing device 702. Employing the elements 704, 706, 708, etc., in the connection configuration shown in FIG. 7A preserves the useful HF signal components and substantially reduces LF noise. It should also be noted that analog or digital implementations of the noise mitigation system may be utilized in different embodiments. In an analog implementation, the noise correction calibration operations comprises tuning an adjustable non-linear circuit to produce a correcting waveform based on the detected correlations between the instantaneous amplitude waveform and portions of the first LF component. An example of a digital implementation is briefly described below in connection with FIG. 8A.

Figure 8A:
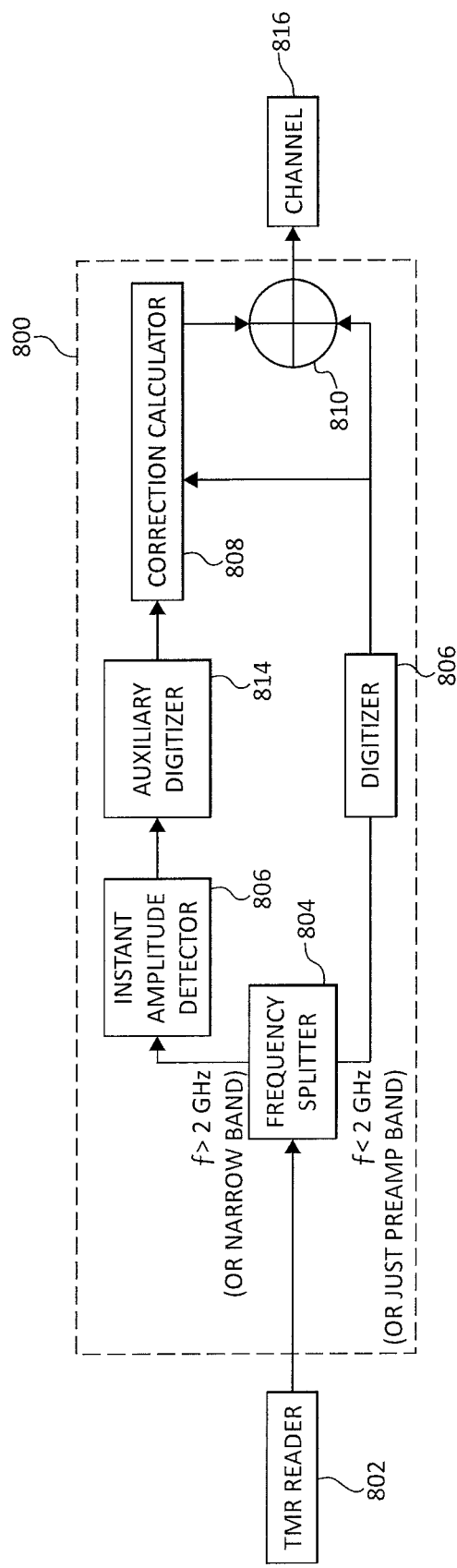
FIG. 8A is a block diagram of a noise mitigation system in accordance with another embodiment.

FIG. 8A illustrates a noise mitigation system 800, which may be employed in magnetic recording, in accordance with another embodiment. As in the case of noise mitigation system 700 of FIG. 7A, the noise mitigation system 800 of FIG. 8A employs a frequency splitter 804, an instant amplitude detector 806, a correlation calculator 808 and a summing node 810. Additionally, system 800 includes a first digitizer 812 and a second digitizer 814. Therefore, correction calculator 808 receives digital values as inputs. As can be seen in FIG. 8A, noise mitigation system 800 is positioned between a reader (e.g., a tunnel magnetoresistive (TMR) reader) 802 and a channel 816 of a data storage device (e.g., a disc drive of the type described below in connection with FIG. 8B). The configuration shown in FIG. 8A assumes that an interconnect between the reader 802 and channel 816 cuts out the HF signal, and therefore system 800 obtains the HF signal before it is cut out. In an alternate embodiment, if the interconnect is able to carry the HF signal to a preamplifier board, all electronic components of noise mitigation system 800 may be placed on the preamplifier board. In the embodiment of FIG. 8A, a threshold frequency of about 2 GHz may be used to split the signal received from reader 802 into LF and HF components. Alternatively, the LF components obtained may simply be within the preamplifier band, and the HF components may be a narrower band than all frequencies above 2 GHz. Noise mitigation system 800 of FIG. 8A operates in a manner substantially similar to noise mitigation system 700 of FIG. 7A and therefore a description of the operation of the noise mitigation system is not repeated in connection with FIG. 8A. A description of a disc drive in which noise mitigation system 800 may be employed is provided below in connection with FIG. 8B.

Figure 8B:
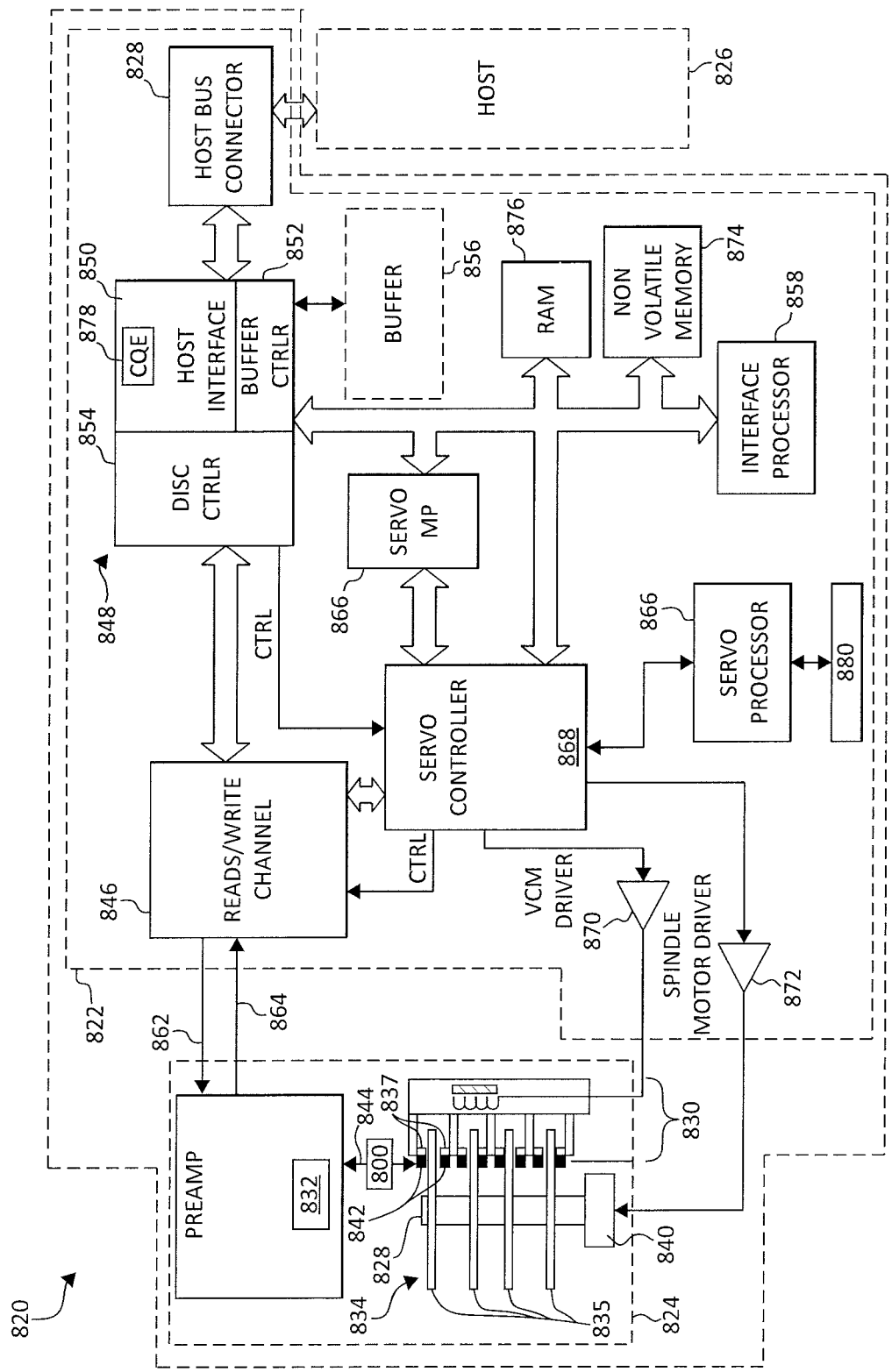
FIG. 8B is a block diagram of a disc drive in accordance with one embodiment.

Referring now to FIG. 8B, an example embodiment of a disc drive data storage system 820 in which in which noise mitigation may be carried out using system 800 of FIG. 8A is shown. Disc storage system 820 includes a printed circuit board assembly (PCBA) 822 and a head-disc assembly (HDA) 824. PCBA 822 includes circuitry and processors, which provide a target interface controller (or drive controller) for communicating between a host system 826 and HDA 824. Host system 826 can include a microprocessor-based data processing system such as a personal computer or other system capable of performing a sequence of logical operations. Data is transmitted between host system 826 and PCBA 822 via a host bus connector 828. HDA 824 includes an actuator assembly 830, a preamplifier 832, and a disc assembly 834. Disc assembly 834 includes one or more media discs 835, stacked on a spindle assembly 838. Spindle assembly 838 is mechanically coupled to a spindle motor 840 for rotating the disc(s) at a high rate of speed.

Actuator assembly 830 includes a voice coil motor, and multiple actuator arms. Located at the end of each actuator arm are one or more sliders/transducer heads such as 842, which are associated with a respective disc surface. Transducer heads 842 communicate with disc controller circuit board 822 via a cable assembly 844 connected to preamplifier 832 for reading and writing data to the transducer head's associated disc surface. Preamplifier 832 provides an amplified signal to a read/write channel 846 of PCBA 822. Read/write channel 846 performs encoding and decoding of data written to and read from the disc.

A servo processor 866 provides intelligent control of actuator assembly 830 and spindle motor 840 through a servo controller 868. By commands issued to servo controller 868 by servo processor 866, VCM driver 870 is coupled to move actuator assembly 230 and spindle motor driver 872 is coupled to maintain a substantially constant spin rate of spindle motor 840.

PCBA 802 includes a host interface disc controller (HIDC) application-specific integrated circuit (ASIC) 848. ASIC 848 includes a host interface 850, a buffer controller 852, and a disc controller 854. Host interface 850 communicates with host system 826 via host bus connector 828 by receiving commands and data from and transmitting status and data back to host system 206. A command queuing engine (CQE) 258 is incorporated in host interface 230.

Buffer controller 852 controls a non-volatile buffer memory 856. Disc controller 854 tracks the timing of data sectors passing under a currently selected transducer head and accordingly sends data to and receives data from read/write channel 846. Disc controller 854 also provides for error correction and error detection on data transmitted to and read from discs 824.

An interface processor 858 manages a queue of commands received from host 826 with the assistance of the CQE 878 embedded in host interface 850. Interface processor 858 interfaces with functional elements of PCBA 822 over a bus 860, for transfer of commands, data, and status.

Disc system operational programs may be stored in non-volatile program storage memory 874, such as read-only memory (ROM) or flash memory, and are loaded into random access memory (RAM) or program loading memory 876 for execution by interface processor 858. Suitably, servo processor 866 may have integrated or separate memory 880 for storage of servo programs.

As noted above, disc storage system 820 includes noise mitigation system 800. In the embodiment of FIG. 8B, noise mitigation system is included between heads 842, which may each include a reader, and preamplifier 212. In the interest of simplification, only one noise mitigation system 800 is shown in FIG. 8B. However, each head 222 may be connected to a different noise mitigation system 800 and therefore disc storage system 800 may include eight different noise mitigation systems. Also, as indicated earlier, noise mitigation system 800 may be within preamp 212 in some embodiments. Noise mitigation system 800 operates in a manner described earlier in connection with FIGS. 7A, 7B and 7C.

Figure 9A:
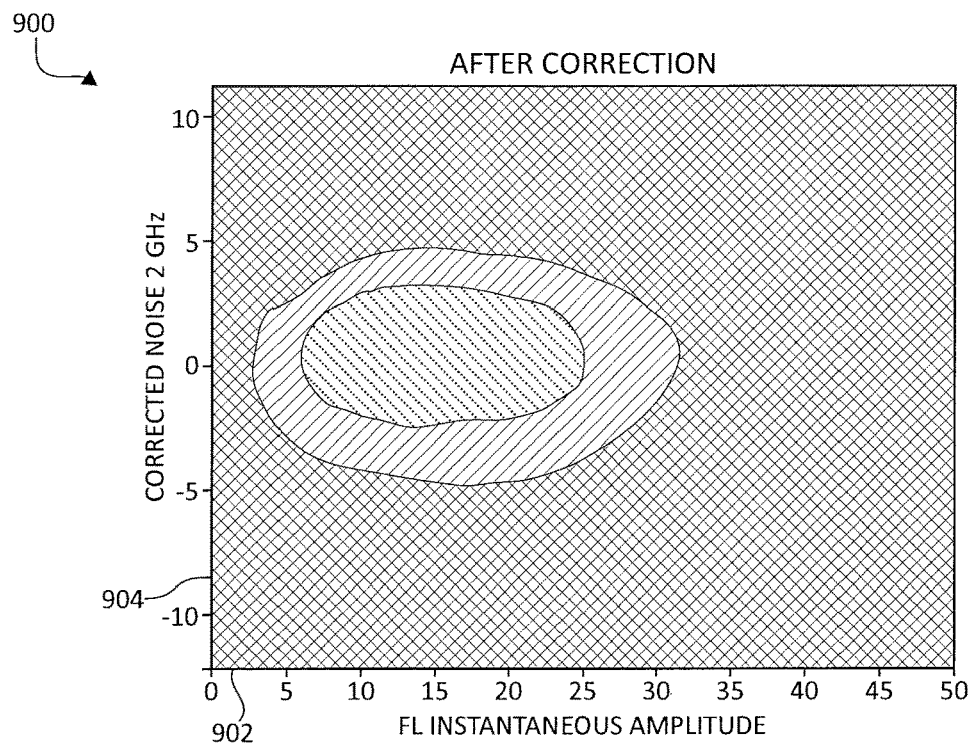
FIGS. 9A and 9B show a two-dimensional histogram and a spectrum, respectively, after correction for a noisy reader.
Figure 9B:
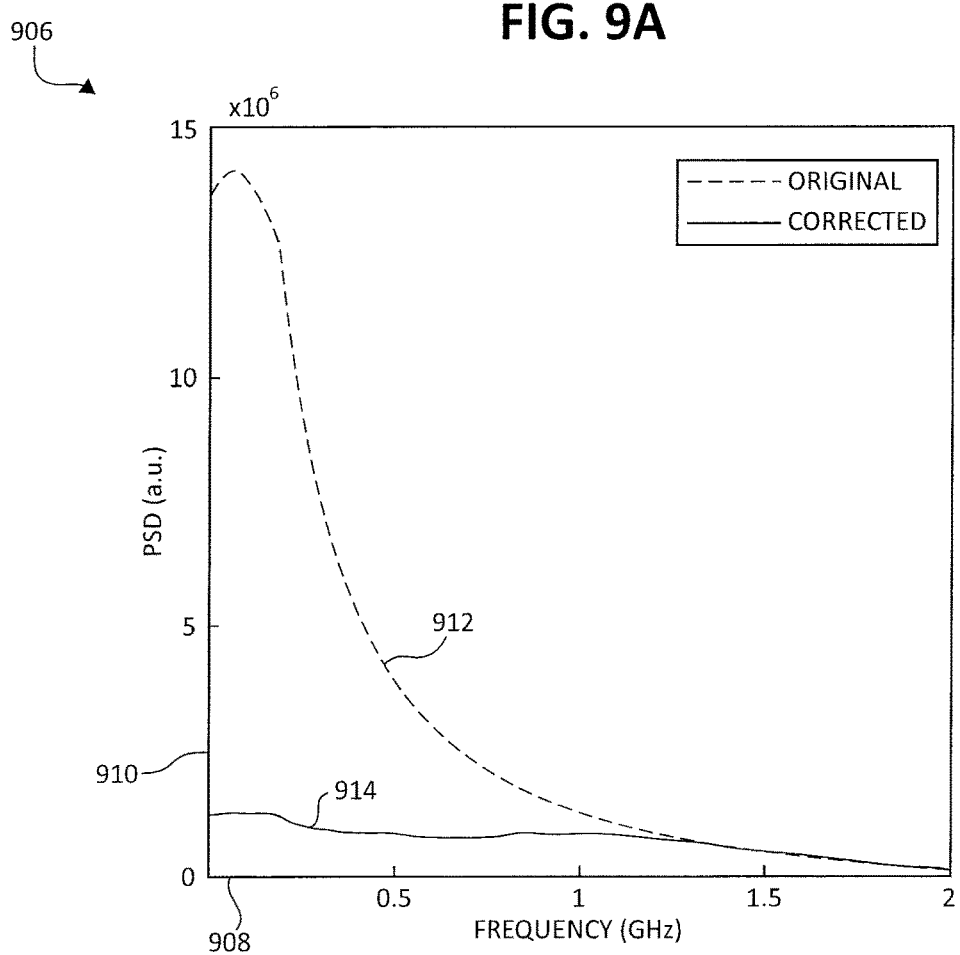

For validation, the method described above in connection with FIGS. 7A and 7B, was implemented in MATLAB (matrix laboratory). FIGS. 9A and 9B show a two-dimensional histogram 600 and a spectrum 906, respectively, after correction for the noisy reader presented in FIGS. 5A, 5B and 6. In FIG. 9A, a horizontal axis 902 represents FL instantaneous amplitude and a vertical axis 904 represents corrected noise. In FIG. 9B, a horizontal axis 908 represents frequency in GHz and a vertical axis 910 represents PSD in a.u. In FIG. 9B, curve 912 represents a spectrum for a reader waveform to which no noise mitigation is applied, and curve 914 represents a spectrum for the reader waveform after noise mitigation is applied. From FIGS. 9A and 9B, it is seen that the correlation between LF noise and oscillation amplitude is gone, and noise PSD is reduced by an order of magnitude for very low frequencies. This demonstration was performed in constant external field, so one-dimensional look-up-table was sufficient, and the LF signal was not used for correction calculation.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
performing noise detection operations and noise correction calibration operations for an apparatus comprising a signal-producing device, the noise detection and noise correction calibration operations comprising:
receiving a first sample waveform from the signal-producing device;
decomposing the first sample waveform into first low frequency (LF) and first high frequency (HF) components;
generating an instantaneous oscillation amplitude waveform using the first HF component, the instantaneous oscillation amplitude waveform being calculated as a difference between an upper envelope and a lower envelope of the first HF component;
detecting correlations between the instantaneous oscillation amplitude waveform and portions of the first LF component;
calculating noise correction values for the detected correlated portions of the first LF component; and
storing the noise correction values in a lookup table on a non-transitory data storage medium of the apparatus.

2. The method of claim 1, further comprising:
receiving a second sample waveform from the signal-producing device;
decomposing the second sample waveform into second low frequency (LF) and second high frequency (HF) components;
determining an instant amplitude of the second HF component;
employing the instant amplitude of the second HF component to select one of the noise correction values from the lookup table; and
adding the selected noise correction value to the second LF component to obtain an output signal.

3. The method of claim 1, wherein detecting the correlations between the instantaneous oscillation amplitude waveform and portions of the first LF component comprises finding a regression line of the first LF component and the instantaneous oscillation amplitude waveform.

4. The method of claim 3, further comprising: repeating the receiving, decomposing and finding steps for each of a plurality of noise-contributing conditions during calibration.

5. The method of claim 4, further comprising:
receiving a second sample waveform from the signal-producing device;
decomposing the second sample waveform into second low frequency (LF) and second high frequency (HF) components;
employing the second LF component to select one of the noise correction values from the lookup table for undeterminable noise-contributing conditions during normal operation of the apparatus; and
adding the selected noise correction value to the second LF component to obtain an output signal.

6. The method of claim 4, wherein the plurality of noise-contribution conditions comprises an external magnetic field proximate to the signal-producing device and a temperature of the signal-producing device.

7. The method of claim 1, wherein the signal-producing device comprises a micro-electromechanical device or a nano-electromechanical device, and wherein receiving the first sample waveform from the signal-producing device comprises receiving the first sample waveform from the micro-electromechanical device or the nano-electromechanical device.

8. The method of claim 1, wherein the apparatus comprises a disc drive and the signal-producing device comprises a read head, and wherein receiving the first sample waveform from the signal-producing device comprises receiving the first sample waveform from the read head.

9. The method of claim 1, wherein decomposing the first sample waveform into the first LF and the first HF components comprises:
utilizing a predetermined threshold frequency to split the first sample waveform into the first LF and the first HF components, with the first LF component comprising frequencies below the predetermined threshold frequency and the first HF component comprising frequencies above the predetermined threshold frequency; or
utilizing band pass filtering with differing bands to obtain the first LF and the first HF components.

10. The method of claim 2, wherein the apparatus comprises a disc drive and the signal-producing device comprises a read head, and wherein the output signal is provided to a component of a preamplifier of the disc drive.

11. An apparatus comprising:
a signal-producing device; and
a noise-mitigation circuit configured to:
receive a waveform from the signal-producing device;
decompose the waveform into low frequency (LF) and high frequency (HF) components;
determine an instantaneous oscillation amplitude waveform of the HF component, the instantaneous oscillation amplitude waveform being calculated as a difference between an upper envelope and a lower envelope of the first HF component; and employ at least the instantaneous oscillation amplitude waveform of the HF component to enable noise correction for the LF component.

12. The apparatus of claim 11, wherein the noise-mitigation circuit is configured to obtain a noise correction value for the LF component by employing the instant amplitude of the HF component to select a noise correction value from a lookup table stored on a non-transitory data storage medium of the apparatus.

13. The apparatus of claim 12, wherein the noise-mitigation circuit is configured to obtain a noise correction value for the LF component by also employing the LF component to select the noise correction value from a lookup table stored on a non-transitory data storage medium of the apparatus.

14. The apparatus of claim 11, wherein the noise-mitigation circuit is configured to decompose the waveform into the LF and the HF components by:
   utilizing a predetermined threshold frequency to split the waveform into the LF and the HF components, with the LF component comprising frequencies below the predetermined threshold frequency and the HF component comprising frequencies above the predetermined threshold frequency; or
   utilizing band pass filter circuits with differing bands to obtain the first LF and the first HF components.

15. The apparatus of claim 11, wherein:
   the signal-producing device comprises a micro-electromechanical device or a nano-electromechanical device; or
   the apparatus comprise a disc drive and wherein the signal-producing device comprises a read head.

16. The apparatus of claim 15, wherein the output signal is provided to a component of a preamplifier of the disc drive.

17. A method comprising:
   performing noise detection operations for an apparatus comprising a signal-producing device, the noise detection operations comprising:
      receiving a first waveform from the signal-producing device;
      decomposing the first waveform into first low frequency (LF) and first high frequency (HF) components;
      generating an instantaneous oscillation amplitude waveform using the first HF components, the instantaneous oscillation amplitude being calculated as a difference between an upper envelope and a lower envelope of the first HF component;
      detecting correlations between the instantaneous amplitude waveform and portions of the first LF component; and
   performing noise correction calibration operations based on the detected correlations between the instantaneous amplitude waveform and portions of the first LF component.

18. The method of claim 17, wherein performing the noise correction calibration operations comprises tuning an adjustable non-linear circuit to produce a correcting waveform based on the detected correlations between the instantaneous amplitude waveform and portions of the first LF component.

19. The method of claim 17, wherein performing the noise correction calibration operations comprises:
   calculating noise correction values for the detected correlated portions of the first LF component; and
   storing the noise correction values in a lookup table on a non-transitory data storage medium of the apparatus.

20. The method of claim 19, further comprising:
receiving a second waveform from the signal-producing device;
decomposing the second waveform into second low frequency (LF) and second high frequency (HF) components;
determining an instant amplitude of the second HF component;
employing at least the instant amplitude of the second HF component to select one of the noise correction values from the lookup table; and
adding the selected noise correction value to the second LF component to obtain an output signal.

* * * * *

UNITED STATES PATENT AND TRADEMARK OFFICE
CERTIFICATE OF CORRECTION

PATENT NO. : 10,615,887 B1
APPLICATION NO. : 16/139364
DATED : April 7, 2020
INVENTOR(S) : Andrzej Adam Stankiewicz et al.

It is certified that error appears in the above-identified patent and that said Letters Patent is hereby corrected as shown below:

On the Title Page

Item (65) add Prior Publication Data --US 2020/0099456 A1 Mar. 26, 2020--.
Item (56) of the third page, delete Lines 1-14.

Signed and Sealed this
Thirtieth Day of June, 2020

Andrei Iancu
*Director of the United States Patent and Trademark Office*